Figure 5:
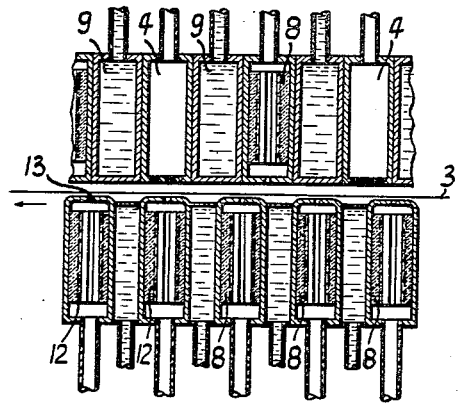

April 16, 1957  H. SCHLADITZ  2,789,064
PROCESS AND APPARATUS FOR THE METALLISATION OF CONTINUOUSLY
TRAVELLING ORGANIC AND INORGANIC FOILS BY THERMAL
DECOMPOSITION OF METAL COMPOUNDS
Filed Feb. 26, 1954  2 Sheets-Sheet 1
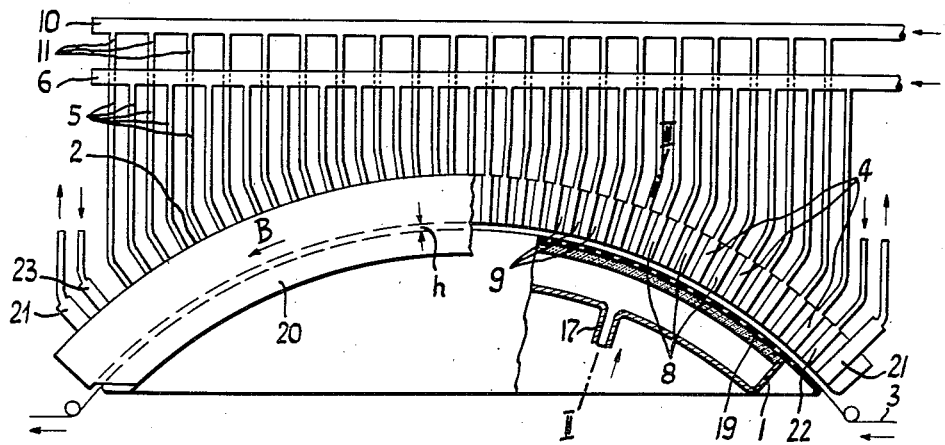
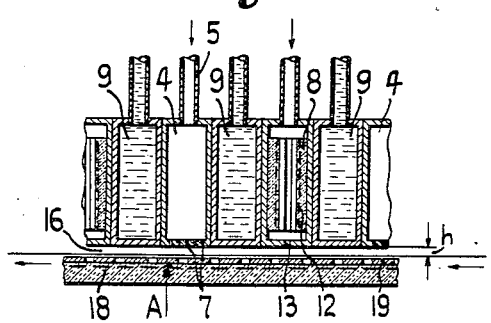
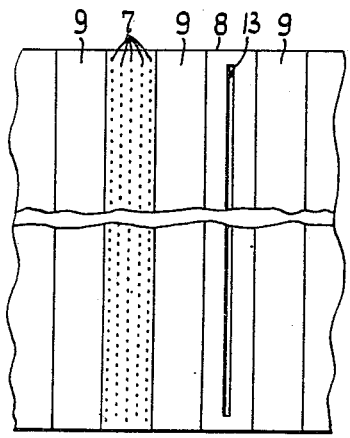
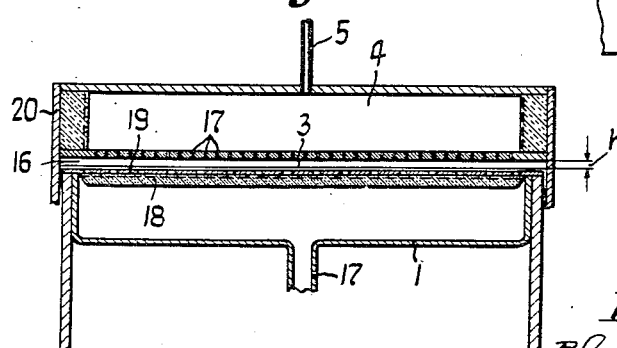
Inventor
H. Schladitz April 16, 1957 H. SCHLADITZ 2,789,064
PROCESS AND APPARATUS FOR THE METALLISATION OF CONTINUOUSLY
TRAVELLING ORGANIC AND INORGANIC FOILS BY THERMAL
DECOMPOSITION OF METAL COMPOUNDS
Filed Feb. 26, 1954 2 Sheets-Sheet 2

Inventor
H. Schladitz
By Glascock Downing Seebold
Attys.

United States Patent Office 2,789,064
Patented Apr. 16, 1957

2,789,064

PROCESS AND APPARATUS FOR THE METALLISATION OF CONTINUOUSLY TRAVELLING ORGANIC AND INORGANIC FOILS BY THERMAL DECOMPOSITION OF METAL COMPOUNDS

Hermann Schladitz, Munich, Germany

Application February 26, 1954, Serial No. 412,824

Claims priority, application Germany March 2, 1953

14 Claims. (Cl. 117—107)

The invention relates to a process for the metallisation of continuously travelling strips of organic and inorganic foils by thermal decomposition of metal compounds, more especially of metal carbonyls, wherein the foil travels past a feeding means for the metal compound, and is heated to the decomposition temperature of the metal compound before or during this travel.

It is known to guide organic foils over a heated support in a channel of large cross-section and at the same time to blow through the channel a dilute stream of a volatile metal compound, which is partially decomposed on the surface of the foil with the deposition of metal. It has also been proposed to metallise organic foils by heating the foil before or during its travel past a nozzle which blows-on the metal compound. However, with this known process uniform firmly adhering deposits are not obtained, especially on organic materials which are very difficult to metallise, such as paper, foils of plastic material, textiles and the like, and it is impossible to work economically, that is to say, with a relatively great foil speed, with the known process. Detailed experiments have shown that the separation of metals from thermally decomposable metal compounds is a complicated chemical and physical process which yields metallic deposits unsuitable for practical use if it is not carefully controlled. Thus, in the aforesaid known metallising processes the chemical decomposition of the metal compound partially takes place before it reaches the heated surface, which is due primarily to the heat convection of the gas molecules present on the surface, which emanate from the inert protecting gas or from the gaseous reaction products of the metal compound. A considerable loss of metal occurs by aggregation of prematurely separated metal atoms or particles which are in part carried away with the gas stream. On the other hand, these particles produce a growth of coarse structure in the metal films when they are partially deposited, so that the fine uniform metal deposit having the mechanical adhesion, strength properties and electrical conductivity absolutely essential is not obtained.

It is furthermore necessary for the economic metallisation of continuous strips to produce a homogeneous metal deposit of sufficient strength so rapidly that it is possible to work with the strip of foil travelling at maximum speed. Therefore, in order to conduct a maximum quantity of metal compound per unit time in the form of a free gas stream in accordance with the known processes, or to blow such a gas stream on to the foil by means of a nozzle, it is necessary to work with a relatively high concentration of the metal compound in the gas stream so that a sufficiently thick deposit is obtained. However, this undeniably results in the formation of a non-homogeneous metal deposit of coarse structure which is of no practical use, as has hereinbefore been mentioned. This is also due to the fact that in the deposition process the reaction conditions vary considerably, because if the colder stream of metal compound is blown on to the foil heated to decomposition temperature, a considerable cooling of the foil surfaces immediately occurs. If nickel carbonyl compounds or iron carbonyl compounds are employed, for example, the temperature difference between the stream and the foil amounts to as much as 100° C. Therefore, if the metal compound is blown on to the foil in a single closed stream, a considerable temperature drop occurs at the surface during the process of deposition and a homogeneous deposit of fine structure can never be obtained in this manner, because in order to obtain this result it would be necessary to maintain as constant as possible an optimum decomposition temperature during the deposition process.

The aforesaid disadvantages of the known methods of metallisation are obviated in the process according to the invention by reason of the fact that the metal compound is blown on to the surface of the foil in finely divided form and in small quantities by a plurality of fine jets arranged in juxtaposition to one another and one behind the other in the direction of travel of the foil, the said jets reaching the immediate vicinity of the surface without being decomposed by cooling, while the quantity of heat extracted from the foil surface during the process of metallisation is continuously replaced between the rows of jets. While in the known method of blowing on the metal compound in a single closed stream a substantial cloud of metal compound is formed, a thin gas film of the metal compound is formed on the foil surface by the feeding of the undecomposed metal compound in finely divided form in the immediate vicinity of the said surface, and the metal is deposited from the said film to form a fine homogeneous deposit on the foil. By means of the fine jets, the metal compound is finely divided and only supplied in small quantities, that is to say, no more is fed than can actually be directly deposited on the surface. Moreover, due to the feeding of the metal compound in small jets, the aforesaid cooling of the foil surface is only low, so that the extracted quantity of heat is immediately replaced between the individual jets and the whole metallising process, which is subdivided into a large number of individual metallising processes taking place one behind the other is completed under substantially constant reaction conditions.

The metal film which is formed under a fine jet of metal compound is naturally very thin, but since a large number of such fine jets are situated one behind the other, the metal layer becomes progressively thicker during the travel of the foil past the individual jets, so that finally the foil is covered with a sufficiently thick uniform metal layer formed from a large number of metal layers applied substantially one over the other.

While in the known method of applying the metal compound by means of a single nozzle it is only possible to work very slowly, the new process permits a substantial increase in the speed of the foil, which may amount to several metres of foil per second.

The invention will hereinafter be more particularly described with reference to the embodiments illustrated by way of example in the accompanying drawings, in which:

Figure 1 is a diagrammatic front elevation of a metallising apparatus for continuously travelling foils, partly in section, Figure 2 is a cross-section on the line II—II of Figure 1, Figure 3 is a section of Figure 1 on a larger scale, Figure 4 is a view from below in the direction A of Figure 3, and Figures 5 to 7 show in section metallising apparatus of different construction.

The apparatus illustrated in Figures 1 and 2 consists of a lower part 1 constructed as a heating table, and an upper part 2 designed substantially as a sprinkler. The foil 3 to be metallised is drawn in the direction of the arrow over the heating table 1, which is preferably fashioned in the form of an arc of a circle in order to enable the foil to bear more satisfactorily thereon. The sprinkler, which is arranged at a short distance $h$ above the heating table 1 and is adapted to the arcuate form thereof, consists of a large number of spaced sprinkler heads 4, to which the volatile metal compound is fed from a header 6 through pipes 5.

Formed in the sprinkler heads are a plurality of fine outlet apertures formed as slots or bores. In the illustrated constructional example, a number of rows of holes 7 are formed in each sprinkler head, these fine apertures having a diameter of about 0.3 mm. and being spaced about 1.5 mm. apart. The sprinkler heads 4, of which about 20 or more may be provided, thus combine to form a sprinkler extending over a substantial working range, for example of 1 metre, with a plurality of fine outlet apertures for the metal compound arranged in juxtaposition to one another and one behind the other in the direction of travel of the foil.

Figure 7:
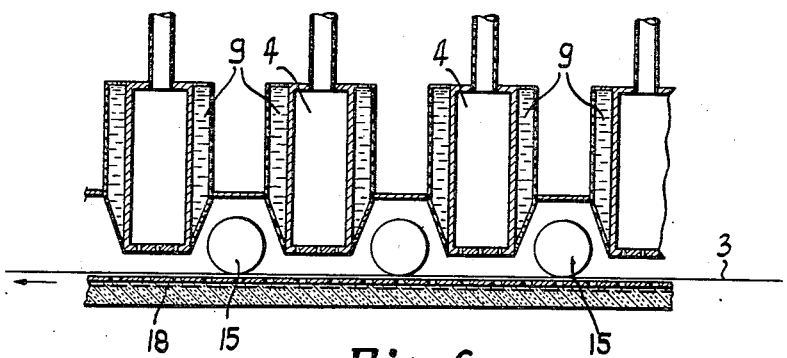
Figure 6:
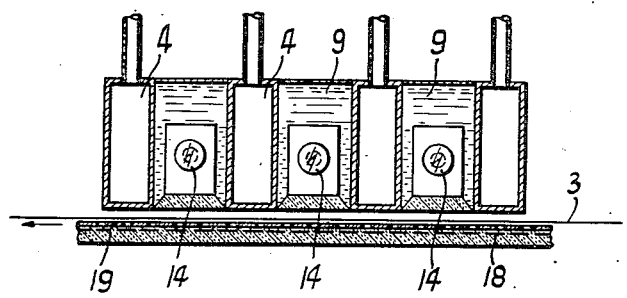

Provided between the sprinkler heads are heaters or heating chambers 8 serving to heat the surface of the foil. As will be seen from Figures 3 and 4, the sprinkler heads 4 are separated from the heaters by cooling chambers 9 (air or water cooling) in order to prevent premature decomposition of the metal compound supplied. Hot gas jets are preferably employed to heat the foil surface to decomposition temperature. For this purpose, an inert gas fed through a header 10 and through the pipes 11 is brought to the appropriate temperature in the heating chambers 8 by means of a resistance heater 12. This heating gas is blown on to the foil 3 through a narrow slot 13, for example 0.5 mm. wide. As is shown in Figures 6 and 7, the surface heating of the foil may also be effected by other means, for example by means of quartz lamps 14 (infra-red radiation) or by means of appropriately heated metal contact cylinders 15 rolling on the foil. The long-wave infra-red radiation is absorbed by the surface of the foil and a rapid heat compensation takes place, so that it is possible to work with the foil travelling at high speed.

Since only the surface participates physically in the separating process in metallisation by thermal decomposition of metal compounds, only the surface of the foil is heated to the optimum decomposition temperature of the metal compound by the aforesaid heating devices arranged between the sprinkler heads 4. In contrast thereto, heating of the foil to decomposition temperature from below, that is to say, from the heating table, would be disadvantageous, since considerably greater quantities of heat must be consumed and in addition excessively high temperature harmful to the organic foil would have to be employed even with organic foils of comparatively great thickness, by reason of the low heat conduction. The supply of heat to the surface of the foil from the same side as the metal compound as illustrated in Figures 3, 6 and 7 affords substantial advantages:

The heat is applied from the outside directly to the point at which it is required. Moreover, it is possible to effect a compensation of the heat loss in the extremely short time between the individual metallising operations, that is to say, between the sprinkler heads 4. In the metallisation of organic foils, to which this type of metallisation is most frequently applied, the sensitive substance, which cannot withstand any harmful action, particularly at the boundary surface between the organic substance and the metal is sparingly treated. Finally, the thermal energy required only for the surface heating is small. This fact is also important in the sense that, with the high foil speed of several metres per second, a considerable quantity of heat is continuously extracted from the metallising apparatus and lost.

As will be seen from Figs. 1, 3, 5, 6 and 7 the heating means consisting of the heating devices 8, 12 and 14, 15 extends over the entire length of the sprinkler 2, each of the heating devices being disposed between sprinkler heads.

A further essential feature resides in the fact that the sprinkler 2 and the sprinkler heads 4 are arranged at a minimum distance $h$ from the foil. This distance, and the height $h$ of the gas duct 16 between the heating table 1 and the sprinkler, amounts for example to 2 mm. and less. This duct height is so small that, taking into account the small free travel of deposited metal particles, no appreciable aggregation occurs and a substantially laminar flow of the gas mixture in the direction B is produced in the space 16, whereby the deposition process is promoted. For this purpose, the adjustment is so effected that the speed B of the gas in the duct corresponds substantially to the speed of the foil. The latter is relatively large and amounts approximately 0.5 to 6.0 yards/second, in average about 2.0 yards/second. The outlet speed of the metal compound out of the fine outlet apertures 7 is smaller than the speed of the foil with respect to the development of gaslike reaction products in the space 16. It will be appreciated that the space 16 actually forms a conduit for passage of a foil together with gases adjacent its surfaces and in that sense it comprises a duct.

The heating table 1 is provided in order additionally to preheat the foil 3 to below the decomposition temperature of the metal compound. In the metallisation of paper and the like, when nickel carbonyl is employed as metal compound, the foil is preheated by this heating table 1, for example, to about 125° C. The temperature drop in the foil is thus reduced, and when the foil is preheated the compensation for the loss of heat under each sprinkler head 4 in the metallising process by means of the heating means 12, 14 and 15 will take place more rapidly, so that with preheating by means of the heating table 1 the speed of the foil can be increased. The heating table designed as a chamber may be heated with circulated hot oil or the like.

With the advantageous constructional form illustrated, the foil is heated from below by means of inert gas which is introduced at 17 into the table 1 and after travelling past an electric resistanc heater indicated at 18 flows through the bearing surface of the table, consisting of a perforated metal plate 19, to the foil. A uniform preheating is then effected by this hot oil at all points by this hot gas, even when the foil does not bear uniformly on the table. Instead of the heating means hereinbefore described and illustrated in Figure 3, it is possible in accordance with Figure 5 for the heating table to consist of a number of the heating chambers 8 employed for the surface heating, over which the foil is drawn, the preheating of the foil being effected by hot gas jets issuing from slots 13. In one particular case, that is, in the metallisation of extremely thin foils of up to about 15 mm. thick, it is possible to omit the surface heating and to heat the foil to decomposition temperature from below only by means of the heating table illustrated in Figures 3 or 5.

As is shown in Figure 1, suction chambers 21 and gas chambers 22 and 23 are provided at the inlet and outlet of the duct 16 closed off by the side plates 20. Inert gas is blown on to the foil by means of the gas chambers 22 in order to withhold from the apparatus and from the duct 16 the air carried along by the foil. The gas chamber 23 arranged at the outlet, through which the cooled inert gas is blown on to the foil, also has the object of withholding the air and is intended at the same time to cool the metal film in order to prevent oxidation thereof by the air. The reaction gases, which consist of carbon monoxide when carbonyl is employed, are withdrawn by means of the suction chambers 21 and if desired the quantities of metal gas not yet completely used are thereby fed to a recovery installation.

In this connection, it is to be noted that it is advantageous to work at temperatures lower than the complete decomposition temperature if high-grade fine-grained deposits are to be obtained which contain no metal dust or coarse grains. If nickel carbonyl is employed, which decomposes completely at 200° C., the surface of the foil is advantageously heated, for example, only to a temperature of about 150°–180° C.

In order that the metal particles may have a sufficiently long path of free travel in the gas duct 16, and to prevent aggregation of these metal particles before they are deposited, the metal compound fed is diluted with a protective gas in the manner known per se.

The invention renders possible the production of firmly adhering metal deposits of extremely fine structure, the metal particles of the metal layer produced having a grain size of a colloidal order of magnitude and less. The present invention is therefore particularly applicable to the production of paper and foils for condensers.

By organic and inorganic foils in the meaning of the invention are meant not only thin webs of paper, plastic or metal, but also other sheet-like materials, such for example as webs of textile fabrics, glass fibers or the like.

I claim:

1. Process of depositig a uniform firmly adherent coating of finely divided metallic particles continuously upon a moving base material in thin sheet form, comprising blowing a plurality of finely divided jets of a heat decomposable organic material in an inert carrier gas, said jets comprising a plurality of jets spaced close together in a pattern extending in depth both in the direction of travel of the sheet material and from side to side across the path thereof and emanating from a source of supply to form said jets maintained close to the surface of the moving sheet material being coated, supplying heat to said moving sheet material sufficient to decompose said heat decomposable metal in contact with said sheet from a plurality of heating sources alternating with said jet sources, and supplying a cooling medium to said jet sources interposed between said jet sources and said heat sources.

2. The process as defined in claim 1, wherein the jet sources are maintained in close proximity to said moving sheet at a distance of about 1 to 3 mms.

3. The process as defined in claim 1, wherein the jets are produced at an initial diameter of about 0.3 mms. and the jets are disposed in a pattern about 1.5 mms. apart.

4. The process as defined in claim 1, wherein the sheet material is coated by passing the same by the plurality of jets at a rate of about 0.5 to 6.0 linear yards per second.

5. The process as defined in claim 1, wherein the sheet material is at least partially heated from the side of the sheet opposite to said coating.

6. Apparatus for continuously metallizing thin sheet materials continuously by decomposition of a heat decomposable metal compound on the surface of said sheet material, comprising a table, means for moving the sheet material continuously over the surface of the said table, a jet head disposed above said table in close proximity thereto having a plurality of fine openings through which coating material is adapted to be supplied in a plurality of jets disposed across the width of said sheet material and in spaced relation thereto, means for supplying a cooling medium to each jet, and means for supplying heat to said sheet material.

7. Apparatus as defined in claim 6, wherein the table surface is arcuately curved and the means for passing sheet material thereover is adapted to maintain the moving sheet in a state of tension over said arcuate surface.

8. Apparatus as defined in claim 6, wherein the jet head is disposed about 1 to 3 mms. from said table surface.

9. Apparatus as defined in claim 6, wherein several neighboring jets are supplied from a common source.

10. Apparatus as defined in claim 6, wherein each jet source comprises a hole in said jet head having a diameter of about 0.3 mm. disposed at a distance from another jet about 1.5 mms.

11. Apparatus as defined in claim 6, wherein the means for supplying heat is a narrow slot cut from side to side of said jet head through which a fluid heating medium is adapted to be passed downwardly onto the moving surface of the sheet being coated.

12. Apparatus as defined in claim 6, wherein the table has a heating means on its lower side adapted for supplying a substantial portion of the necessary heat to said sheet being coated.

13. Apparatus as defined in claim 6, wherein each opposite inlet and outlet end for the sheet material passing through the apparatus has a gas trap adapted to alternately replace occluded air with hot inert gas at the inlet and cold inert gas at the outlet.

14. Apparatus as defined in claim 6, wherein the jet supply means is adapted to supply the coating substance at a rate corresponding to the rate of travel of the sheet material maintained by said means for continuously moving the sheet material through the apparatus.

References Cited in the file of this patent

UNITED STATES PATENTS

| | | |
|---|---|---|
| 2,332,309 | Drummond | Oct. 19, 1943 |
| 2,426,377 | Smith | Aug. 26, 1947 |
| 2,516,058 | Lander | July 18, 1950 |
| 2,526,012 | Feldmeier | Oct. 17, 1950 |
| 2,656,284 | Toulmin | Oct. 20, 1953 |